Sept. 3, 1968 T. F. HELMS 3,399,563
METHOD AND APPARATUS FOR TESTING THE PRESSURE
TIGHTNESS OF CONTAINERS
Filed Dec. 16, 1966 4 Sheets-Sheet 1

FIG.1

INVENTOR
THOMAS F. HELMS
BY
Robertson, Bryan, Parmelee & Johnson
ATTORNEYS

Sept. 3, 1968 T. F. HELMS 3,399,563
METHOD AND APPARATUS FOR TESTING THE PRESSURE
TIGHTNESS OF CONTAINERS
Filed Dec. 16, 1966 4 Sheets-Sheet 2

FIG. 2

INVENTOR
THOMAS F. HELMS
BY
Robertson, Bryan, Parmelee & Johnson
ATTORNEYS

United States Patent Office 3,399,563
Patented Sept. 3, 1968

3,399,563
METHOD AND APPARATUS FOR TESTING THE PRESSURE TIGHTNESS OF CONTAINERS
Thomas F. Helms, New Fairfield, Conn., assignor to Idex Corporation, a corporation of Connecticut
Filed Dec. 16, 1966, Ser. No. 602,282
14 Claims. (Cl. 73—45.2)

ABSTRACT OF THE DISCLOSURE

This invention relates to testing method and apparatus for determining the pressure tightness or leakproof quality of containers or parts thereof such as ends, bodies and the like. More particularly, it relates to testing method and apparatus for immediately determining whether containers, ends, bodies and the like leak by detecting the high frequency vibrations that are produced by the leakage of fluid under pressure through any minute opening, i.e., micro opening, which might exist in the article tested. Fluid under pressure is applied to a surface of the article being tested, and high frequency vibration sensitive means is arranged to be responsive to the vibrations produced by the pressurized fluid passing through any micro opening or openings in this article.

BACKGROUND OF THE INVENTION

1. *Field of the invention*

This invention has particular application to the testing of easy opening can ends such as those having tear tabs or strips which can be pulled free to create pouring openings or to sever the end for removal from the can body. Such tear tabs are used, for example, in metal beer cans, and the tear strips are used for coffee cans and the like.

Because such tabs and strips are formed by scoring or otherwise weakening the metal along predetermined tear lines, there is a problem in obtaining just the right amount of weakening at the tear lines to make it easy to open the cans while avoiding the possibility of creating minute or micro leaks through which fluid pressure may be slowly lost or which could result in the contents of the can becoming unfit for consumption. The present invention provides means for testing the components for pressure tightness and for leakage, before application of the tops to the cans, and more importantly to test each can produced by a production line prior to public use.

2. *Description of the prior art*

In the prior art there are systems for testing containers such as cans and the like for leaks. These prior systems utilize the displacement which occurs as a result of leakage. That is, a substantial period of time must elapse until sufficient fluid has passed through the leakage opening to provide an indication that a leak is present. These prior systems are suitable for indicating leakage openings of substantial size, but they cannot provide indication of micro leaks unless an unduly long time period is consumed.

Because of the slow response of the prior test systems, it has not been feasible to test for micro-leakage of each and every container being made on a modern high-speed production line. Only enough time was available to detect leaks of relatively large size and it was assumed that if the selected containers passed the test, then they were all acceptable for use by the public.

The testing method and apparatus of the present invention provide an immediate effective determination of whether or not the article leaks, regardless of the size of the leak opening, including the most minute micro-opening. This testing apparatus and method provide such immedate response that it enables each and every container to be tested for micro-leakage in a container assembly line.

SUMMARY OF THE ILLUSTRATIVE EMBODIMENTS OF THE INVENTION

According to my invention, the test apparatus comprises walls forming a chamber which can be hermetically sealed. The chamber is insulated for excluding the vibrations created outside the chamber. Through one of the surfaces of the chamber is an opening which can be covered by an article to be tested. Pressure means are provided for sealingly clamping the article in a position covering the test opening of the chamber. The sealingly clamping means include locating means for positioning the article to be tested on the chamber to cover the test opening and sealing means shaped to engage with the locating means to seal the article in the test position. One surface of the article bounds the chamber and the opposite surface thereof is on the exterior of the chamber. Pressure means are provided for applying a predetermined fluid pressure to the exterior surface of the article to be tested so that there may be a differential pressure across the surface to be tested to thereby cause fluid leakage through such surface if the article is defective. Means are provided for depositing a film of moisture on a surface of the article to be tested just before the application of pressure to the exterior surface of the article. Included within the chamber are high frequency vibration sensitive detecting means for detecting any high frequency vibrations which are produced by the passage of the pressurized fluid through any leaks in the article being tested. The high frequency vibration detecting means also identify and categorize the leakage vibrations, and generate a signal in response to the categorized leakage vibrations. Provided in association with the detecting means are removal means for removing the tested article from the test apparatus upon receipt of the amplified signal from the detecting means.

According to another aspect of my invention a multi-station testing apparatus is provided for determining the leak tightness of container ends, bodies and the like, and for rejecting the unacceptable container ends and the like to be used in a container assembly line having predetermined feeding and ejection stations. The multistation test apparatus comprises a frame rotatably mounted on a base. Mounted on the frame and arranged in a circular array are a multiplicity of test apparatus units such as described hereinabove. Means are provided for rotating the frame and each of said test apparatus units successively through the predetermined feeding and ejection stations. Means are provided for sequentially operating the sealingly clamping means, the pressure means, the moisture film depositing means, and the high frequency vibration-sensitive detecting means of each of the test apparatus units as the frame rotates. At a station of rotation of the frame between the feed and ejection stations, rejection means are provided for rejecting the unacceptable articles from each of the test apparatus units. The rejection means is operable upon receipt of an amplified signal from the high frequency vibration sensitive detecting means of each test apparatus unit. Cooperating with the rejection means, are control means which are responsive to the signal from the high frequency vibration sensitive detecting means of each of the testing apparatus units for rejecting the unacceptable tested articles at the rejection station.

In another aspect of my invention, a method is provided for determining the leak tightness of container ends, bodies and the like. In the method, first, a surface of an article to be tested is sound coupled to a high frequency vibration pickup for the detection of high frequency vibrations above a minimum frequency of 20,000 c.p.s. Then, a predetermined fluid pressure is applied to the other surface of the article to be tested. And, lastly, any high frequency vibrations, which are produced by the passage of the pressurized fluid through any leaks in the article tested, are detected, identified and categorized.

In the illustrative preferred embodiment of my invention, a film of moisture is deposited on a surface of the article to be tested just before the application of the fluid pressure.

Moreover, in another aspect of my invention, a method is provided for determining the leak tightness of successive container ends, bodies and the like, and for rejecting the unacceptable container walls, ends and the like to be used in a container assembly line which has predetermined feeding and ejection stations. In the method, successive operations are performed on each article tested. First a surface of an article to be tested is coupled to a high frequency vibration pickup for the detection of high frequency vibrations above the frequency of 20,000 c.p.s. Secondly, a predetermined fluid pressure is applied to the other surface of the article to be tested. Thirdly, any high frequency vibrations which are produced by the passage of the pressurized fluid through any leaks in the article tested, are detected, identified and categorized. Then, a signal in response to the categorized leakage vibrations is generated, and lastly, the signal is utilized to reject the unacceptable tested articles.

In the illustrative preferred embodiment of my invention, a moisture film is deposited on a surface of the article to be tested just before the application of the fluid pressure.

DESCRIPTION OF THE DRAWINGS

With reference to the accompanying drawings, I shall describe the preferred embodiments of my invention. In the drawings.

DESCRIPTION OF THE PREFERRED EMBODIMENTS

Figure 1:
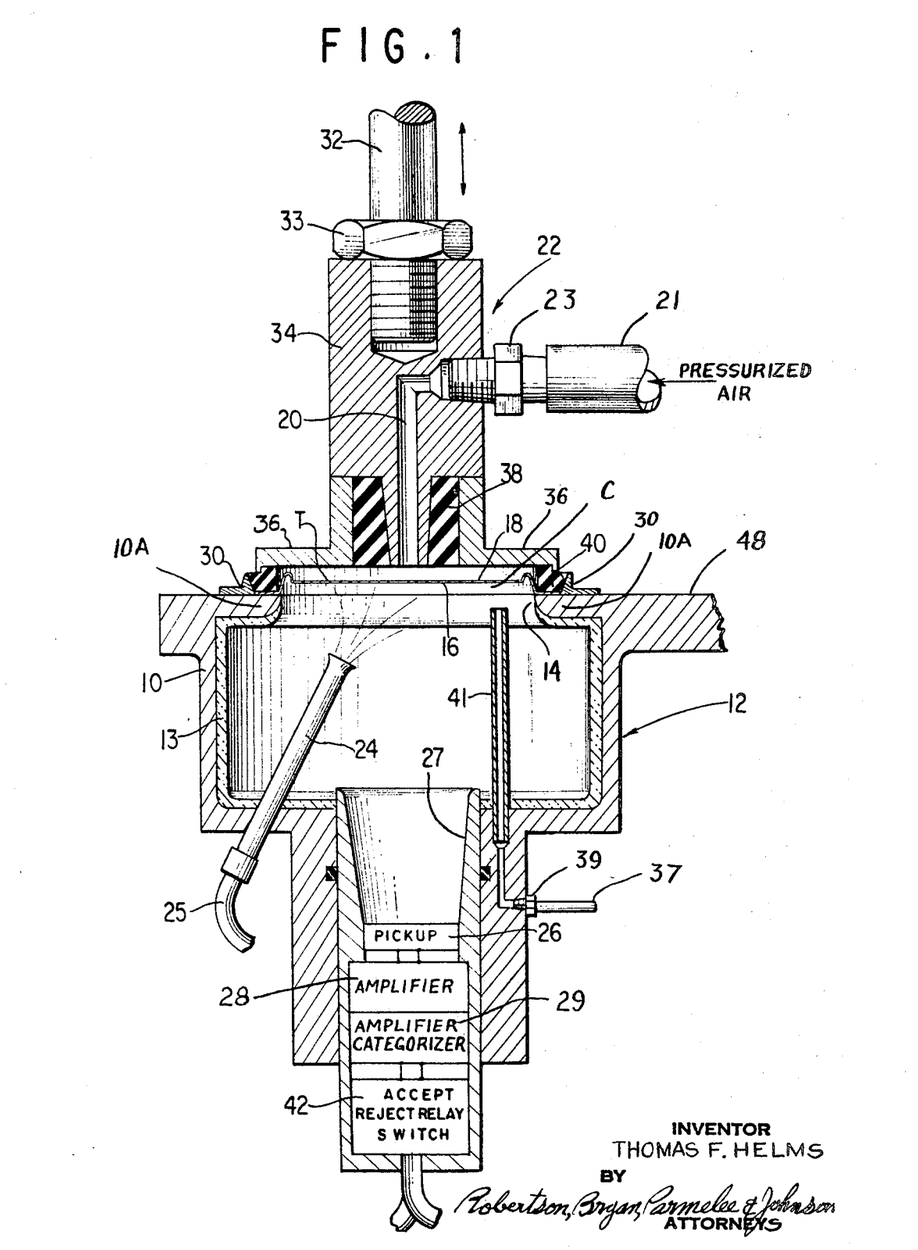
FIG. 1 is a partial sectional elevational view of a single test apparatus unit with the article in a sealed position.
Figure 2:
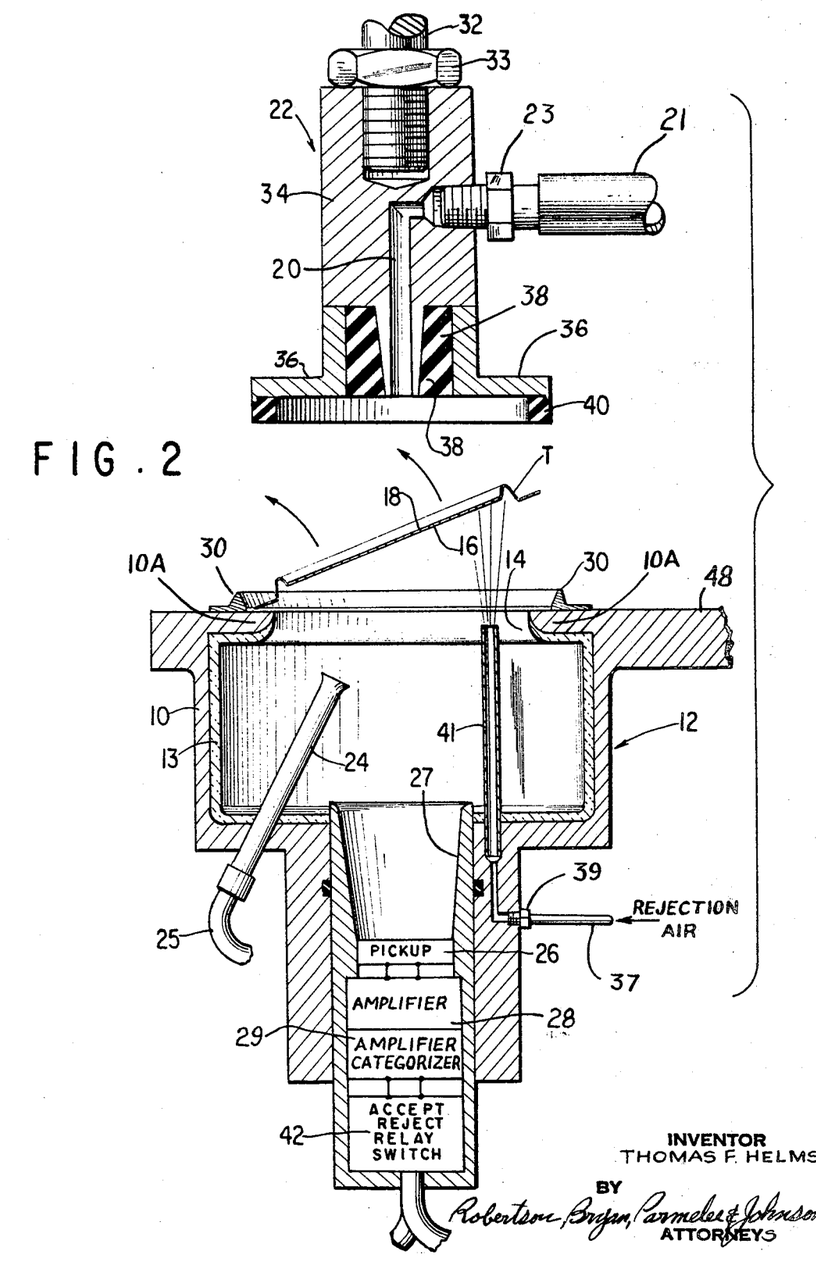
FIG. 2 is a partial sectional elevational view of a single test apparatus unit in an open position.

Referring to FIGS. 1 and 2, my apparatus in its general construction comprises walls 10 forming a chamber 12 having an opening 14. The chamber 12 has an annular support surface 10A for supporting an article T to be tested. A sealing head 22 is provided to seal and clamp the article T in a position on the annular surface 10A, thereby covering the test opening 14, (FIG. 1). In this position, the article T has one surface 16 bounding the chamber 12 and the opposite surface 18 on the exterior or outside of the chamber 12. Means are provided for applying a predetermined fluid pressure to the exterior surface 18 of the article T through a passage 20 in the sealing head 22. Means, such as a fog nozzle 24, is provided within the chamber 12 to deposit a film of moisture on the bounding surface 16 of the article T, just before the fluid pressure is applied to the exterior surface 18. The characteristics and function of this film are described in detail further below. High frequency vibrations sensitive detecting means such as a high frequency vibration pickup 26 is provided within the chamber 12 for detecting the high frequency vibration which is produced by the passage of pressurized fluid through any leakage openings in the article T. The electrical signals from the sensitive microphone pickup 26 are amplified by an amplifier 28 and fed to an amplifier categorizer 29 for comparing the detected vibration to the desired criteria with respect to frequency, amplitude, randomness and duration, as described in detail hereinbelow, and for generating an electrical signal in response to true leakage vibrations. When a true leakage vibration is present the signal is amplified by an amplifier included in the output of the amplifier categorizer 29 to activate a reject relay switch 42 which signals for rejection of the unacceptable article T, by an air reject nozzle 41, as shown in FIG. 2.

In the preferred construction illustrated, FIGS. 1 and 2, the listening chamber 12 has vibration insulation 13, for example, an elastomer, to exclude or prevent most vibrations created outside the chamber from masking the vibrations produced by the leakage of pressure through the article T being tested. Surrounding the test openings 14 is a locating ring 30 which in conjunction with the annular support surface 10A of the chamber 12 forms a test piece receiving cavity for positioning the article T over the opening 14 of the chamber 12. When the article T is hermetically sealed in this position, its interior surface 16 forms a boundary of the chamber 12.

As shown in FIG. 1, the sealing head 22 engages with the article T to seal and clamp the article T in its position on the annular surface 10A over the opening 14. The head 22 is driven or moved into an operating position to press the article T downward against the annular surface 10A. A drive rod 32 threaded into the sealing head 22 is reciprocally operated by any suitable means 51 (FIG. 3), for producing up and down motion of the rod 32, for example, such as a cylinder 51, as shown. The sealing head 22 comprises a connector 34 to which the drive rod 32 is secured by a locknut 33. Attached to the connector 34 is a metal chuck 36 and a rubber sealing bushing 38. Extending around the perimeter of the metal chuck 36 is a protruding sealing ring 40 which is shaped to engage with the locating ring 30 and the periphery of the article T while the article T is seated upon the surface 10A within the locating ring 30 to form a seal with the locating ring 30 and article T in the test position covering the opening 14. Thus, the chamber 12 is hermetically sealed.

The fluid under pressure, which is here shown as pressurized air, is connected to the passage 20 in the sealing head 22 by an air line 21 and fastening 23 to supply this pressurized fluid through the passage 20 to be applied to the article T, which is now in a hermetically sealed relationship with the chamber 12. The fluid pressure is applied to the exterior surface 18 of the article T at a predetermined value and may be in any suitable form, including air or other fluids. The pressurized fluid may also provide the pressure necessary for operating the cylinder 51 (FIG. 3) to move the drive rod 32.

The fog nozzle or nozzles 24, FIG. 1, which deposit a film of moisture on the bounding surface 16 of the article T, is supplied the necessary liquid from a source (not shown) through a flexible tubing 25. The nozzle 24 is placed within the chamber 12 pointing toward the interior surface 16 of the article T. The moisture is preferably deposited in a thin, even film just before the application of the pressure to the exterior surface 18 of the article T. The film of moisture may also be deposited on the exterior surface 18 of the article T prior to the application of pressure. If excess moisture is deposited on the exterior surface, however, there may be a delayed response to the high frequency vibrations produced by the leakage since the pressure is forcing moisture through a very small opening or micro opening, such as $1/10,000$ of an inch or smaller and time is required for such passage of liquid during which time no vibrations are generated. Also, care must be taken not to deposit the moisture on the interior surface 16 in such quantity or condition as to cause drops to form into which the pressurized fluid will bubble in a contained manner so as to muffle or eliminate the high frequency leakage vibrations, resulting in an ineffective test.

According to this invention, it has been found that the size of the leakage opening in an article T is inversely proportional to the frequency of the vibrations produced by the leakage of the pressurized fluid through this opening. That is, the smaller the opening may be, the higher the frequency of the vabration produced by leakage of the pressurized fluid therethrough. Also, the amplitude of the leakage vibration is directly proportional to the size of the leak. The leakage vibration has a true random pattern, is incoherent, and is of more than 10 microseconds duration.

Therefore, the vibrations are tested according to a predetermined amplitude, frequency, randomness, duration standard. That is, a predetermined standard is chosen against which the vibrations are tested in order to indicate which are true leakage vibration. The predetermined standard may be set up on the basis of a certain amplitude, frequency, randomness, duration standard, and any vibration which does not correspond to the desired standard is a stray or spurious vibration caused by transmission of frequencies to the pickup that are not generated as a result of leakage. Such stray or spurious vibrations are rejected and only vibrations which correspond to the standard are passed on by the amplifier to become "reject" signals.

The film of moisture deposited on the article T augments the leakage vibration produced by the passage of pressurized fluid through any leaks in the article T being tested. That is, by depositing a film of moisture on the article T, the high frequency vibration in the range of 20,000 c.p.s. and above (which is produced by the leakage of pressurized fluid through a micro opening) can be detected in spite of the low amplitudes encountered in micro leaks. Thus, a leak opening as small as $1/10,000$ of an inch may be detected. Generally, for larger openings in the article T, for example, about $1/100$ to $1/1,000$ of an inch, the deposition of moisture is not necessary to detect the leakage according to this invention. For very large leaks or to test for absence of the test article T, a check of residual pressure is also made at the end of the test cycle. The absence of pressure will generate a reject signal.

The moisture may also be deposited on the article T by condensation resulting from introducing the article T into a chamber filled with a vapor-saturated gas and then allowing the vapor to condense on the article or by a decrease in temperature of the article itself prior to introduction into the chamber to cause condensation to occur thereon. Either method affords excellent control of the character of the moisture film deposited.

The high frequency vibration sensitive detecting means for detecting the leakage vibrations of article T are preferably located within the chamber 12 for maximum efficiency, FIGS. 1 and 2. The pickup 26 is a sensitive transducer positioned in a sound receiving cavity 27 facing toward and directly in line with the pressure applied to the exterior surface 18 of the article T for immediate, fast response to any vibration which is produced by the leakage of pressurized fluid through any leakage openings in the article T. The leakage vibrations detected by the transducer 26 are converted into an electric signal by the transducer 26. The signal is amplified by the amplifier 28 and connected to the pickup 26 and fed to the categorizer 29 where the signals are tested against the desired standards as explained below. Any true leakage vibrations result in actuation of the rejection relay 42 which effects removal of the article T from the test apparatus by a burst of air or other means, as shown in FIG. 2. The nozzle 41 is actuated by the reject relay 42 only after receipt of a signal from the amplifier categorizer 29.

The leakage vibrations from the tested articles are primarily in the high frequency range, i.e., above 20,000 c.p.s. Therefore, the pickup 26 is preferably a sensitive high frequency transducer so that high frequency vibrations are able to be detected and converted into an electrical signal.

This pickup 26 is connected to the amplifier 28 which is connected to the amplifier categorizer 29 arranged to actuate a rejection relay switch 42 which activates the control means at the proper station (FIG. 5) and which in turn activates nozzle 41 or other means thereby rejecting the article T by a burst of air, FIG. 2. The rejection air is connected to the nozzle 41 by an air tube 37 and fastening 39 to provide the burst of air to be applied to the article A for removal thereof from the test apparatus. The rejection air may be substituted by any suitable fluid. The same type of fluid that is used in conjunction with the nozzle 41 for the removal of the article T, may be applied under pressure to the article T through the passage 20 in the sealing head 22. With this arrangement, only one source of the fluid is required for the operation of the test apparatus.

Figure 3:
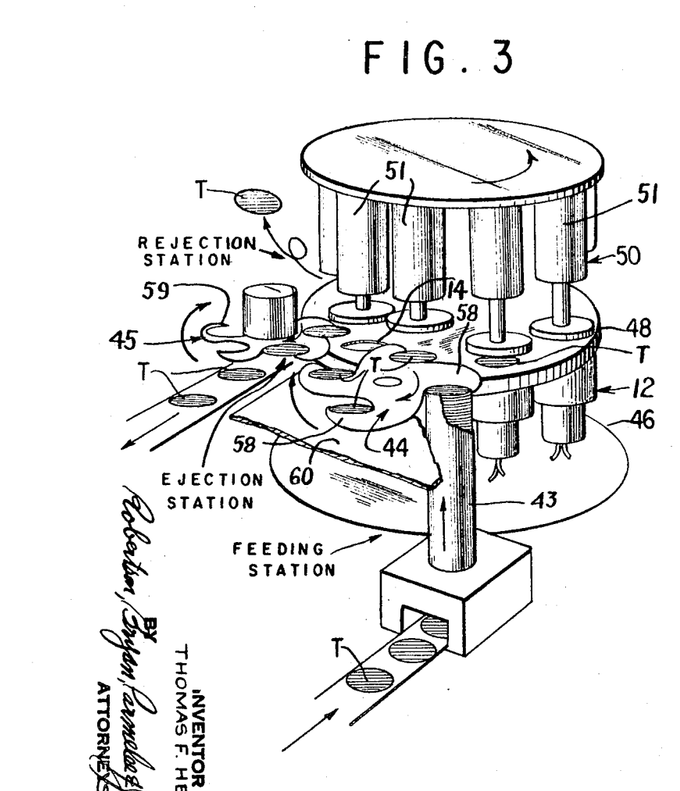
FIG. 3 is a simplified perspective view of a multistation test apparatus with the feeding and ejection stations in a container assembly line.

Referring to FIG. 3, a simplified perspective drawing of the multistation test apparatus is shown according to my invention. The multistation test apparatus is shown in relation to a container assembly line having predetermined feeding and ejection stations. The multistation test apparatus comprises a base plate 46 on which a frame 48 is rotatably mounted. Mounted on the frame 48 in a circular array are a multiplicity of test apparatus units 50 such as the test apparatus shown in FIGS. 1 and 2, and described hereinabove. The frame 48 with the test units 50 may be rotated by any conventional means such as a motor driven roller chain (not shown) engaged with the frame 48. As the test units 50 are successively rotated on the frame 48 through the feeding and ejection stations, the various parts of each test apparatus unit 50 are sequentially operated by the central control means, FIG. 5 as they progress from station to station in their path of rotation.

The articles T are fed from the assembly line to the test apparatus by any suitable means such as an upstacker 43, and associated rotating feeding member 44 with a multiplicity of arms 58, on a top 60. The feeding member 44 rotates at a rate so as to place an article T on each test unit 50 passing through the feeding station. If the articles T are acceptable, they are ejected at the ejection station by a rotating ejection member 45 with a multiplicity of arms 59, FIG. 3.

Figure 5:
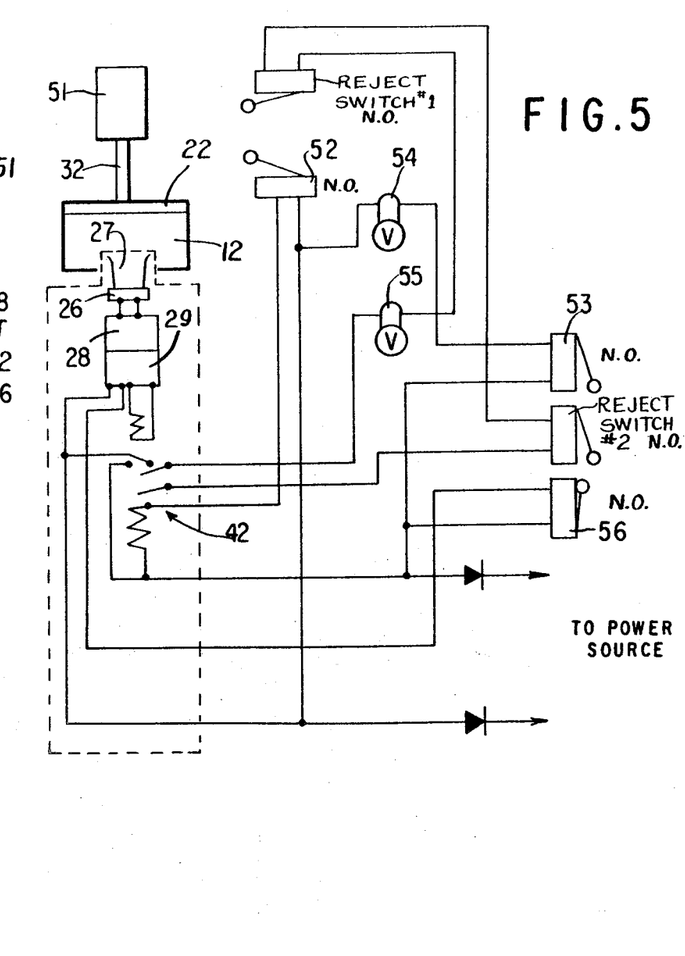
FIG. 5 is a diagram of the wiring circuit for control of the multistation test apparatus of FIG. 3.

The various parts of the apparatus may be sequentially operated by any conventional manner such as the electrical system shown in FIG. 5, which comprises switches operating in sequence for each operation necessary for testing the article T according to my invention. The switches shown may be toggle switches or proximity switches that are mechanically or magnetically operated by the movement of the various parts of the testing apparatus in a known manner. Rejection means such as the rejection nozzle 41, FIG. 2, are provided in each test unit 50 to reject the unacceptable articles T at a predetermined rejection station located between the feeding and ejection stations in the container assembly line.

Figure 4:
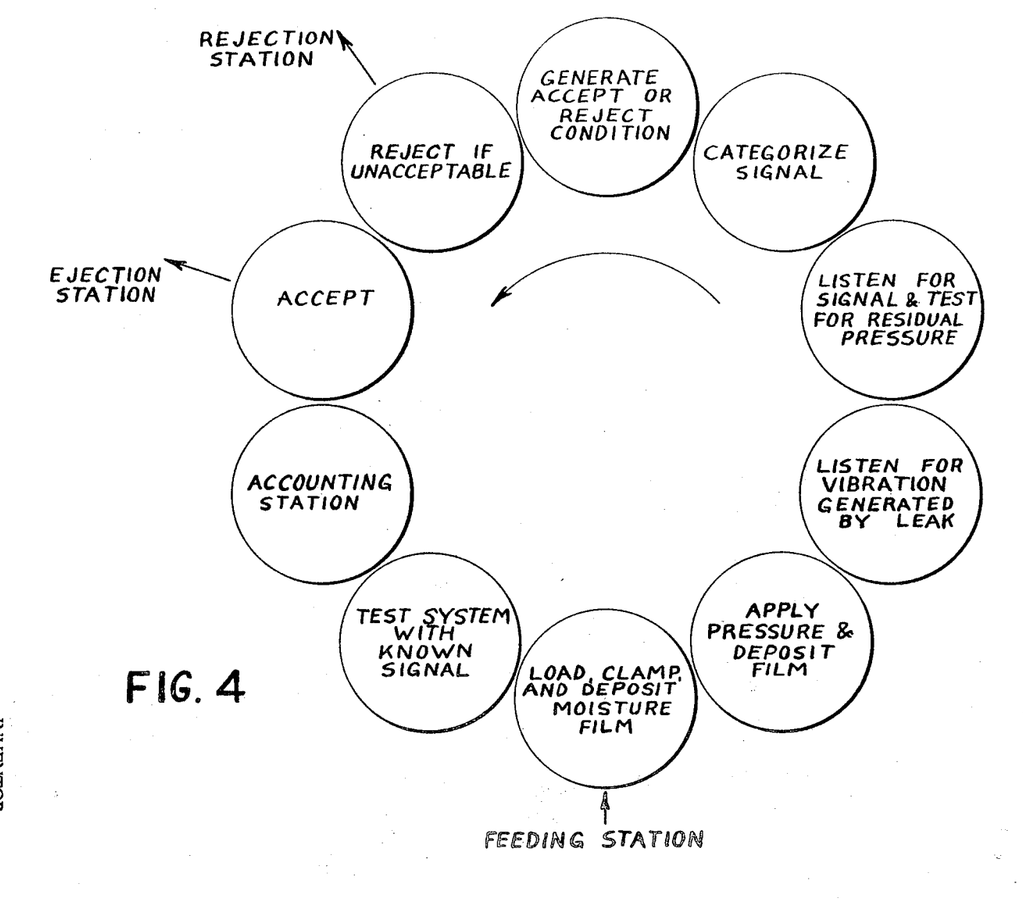
FIG. 4 is a diagram of the successive steps in carrying out my invention illustrated in FIG. 3.

The successive steps of the operation of the multistation test apparatus are shown in FIG. 4. The basic steps in the operation of the single test apparatus (FIGS. 1 and 2) are similar to those of the multistation test apparatus (FIG. 3).

As indicated by the diagram of FIG. 4, an article T, for example, the top of a beer can which has a tear tab, is first placed on the annular surface 10A, within the locating ring 30 on the top of the test chamber 12 in a position to cover the test opening 14. Then the sealing head 22 is moved downward by the drive rod 32 which may be actuated by a cylinder 51 (FIG. 3). The cylinder 51, accordingly, may be actuated by any conventional pressure means. The article T forms a bounding surface 16 of the chamber 12 and the chamber is hermetically sealed when the sealing ring 40 is engaged with the locating ring 30 and the periphery of article T in the test position covering the opening 14, FIG. 1.

Then a predetermined fluid pressure is admitted through the passage 20 in the sealing head 22 and applied to the exterior surface 18 of the article T. Just before the application of the pressure to the article T, a film of moisture is deposited on the interior surface 16 of the article T by means of the fog nozzle 24. Subsequent to these operations, any high frequency vibration which occurs during any leakage of pressure through the surface of the article T is detected by high frequency pickup 26. If there is no leakage vibration detected, then the article is accepted and used in the assembly of the beer can. However, if leakage vibration is detected by the steps indicated in the diagram of FIG. 4 (indicating the article T is unacceptable), the signal in response to the leakage vibration is again amplified and actuates the reject relay which signals the control means at the station to actuate the reject nozzle 41 to remove the article T by a burst of suitable fluid such as air, as shown in FIG. 2. The categorizing of a true leakage signal as distinguished from vibration arising from external sources is described in detail further below. Thus, the article is either rejected at the rejection station or is ejected at the ejection station.

The apparatus includes accounting equipment to count the relative numbers of accepted and rejected articles.

Before each of the test units 50 (FIG. 3) moves into the feeding station, they are all automatically checked each time around by feeding a known test vibration signal into each pickup 26 to make sure that each of the units 50 of the apparatus is in fully operative condition.

In FIG. 5, a conventional wiring system is shown for the operation and control of the multistation apparatus. The various switches are respectively opened and closed during the testing of each article T. By way of illustration (in the operation of the multistation apparatus) after the article T has been placed on the individual test apparatus unit 50 by the rotating feeding member 44, normally open (N.O.) reject switch No. 1 is closed by the position of the sealing head 22 in its upper position. The closure of this switch No. 1 energizes a solenoid valve 55, thus opening this valve 55 so as to feed compressed air to the cylinder 51 to cause the cylinder 51 to move the drive rod 32 downward which in turn moves the sealing head 22 down to press the article T against the surface 10A so that the article T is now clamped in test position. Then the normally open test switch 53 is closed by rotation of the frame 48 into a predetermined position to energize a solenoid test valve 54 to open this test valve 54 so that fluid pressure is applied to the exterior surface 18 of the article T through the passage 20 of the sealing head 22. Just before the application of the fluidized pressure, with the test switch 53 closed, a film of moisture is deposited on the interior surface 16 of the article T by the fog nozzle 24.

After a predetermined fluid pressure has been applied to the exterior surface 18 of the article T, the rotation of the frame 48 into a sequential predetermined position allows the test switch 53 to open which closes the valve 54. Subsequently, the normally open listen switch 56 is closed by rotation of the frame 48 into a further predetermined position in sequence to energize the amplifier 28 to amplify any signals that the pickup 26 may generate as a result of any high frequency vibrations which are produced by the passage of pressurized fluid through any leaks in the article T. If no leakage vibration is detected, the relay switch 42 is left in an open or acceptance position, and the article is acceptable. It is then ejected at the ejection station by the rotating member 45, FIG. 3. However, if leakage vibration is detected, the relay switch 42 is automatically moved into a reject position by the amplifier signal transmitted by the amplifier 28 to the control means. The relay switch 42 closes a circuit to a normally open reject switch No. 2 which is closed by rotation of the frame 48 to a further predetermined sequential position. Closure of this reject switch No. 2 in turn opens a reject solenoid valve 55 to allow a blast of rejection air to pass through the reject nozzle 41 for removal of the unacceptable article T (FIG. 2) at the predetermined rejection station, FIG. 3. This series of operations is then repeated by closing the normally open reset switch 52 which is connected so as to return the relay 42 to its initial position for repeating the above described cycle of operations for each successive article T to be tested.

The source of power may be any conventional type of electrical power sufficient to operate the various parts of the apparatus.

The sequential operation of the various parts of the multistation apparatus may be controlled by any conventional means known in the art so long as the various parts are actuated in the proper sequence and for the necessary time according to the invention. The control means may be set up so as to operate the apparatus in desired time sequence periods to coodinate with the timed movement of the tested articles in the container assembly line.

It is to be understood that the terms "moisture" and "film of moisture" are to be interpreted to include any suitable liquid such as water which has the characteristics for augmenting the detection of leakage sounds in the low amplitude high frequency range of 20,000 c.p.s. and above. The desired liquid characteristics are (1) the ability to wet the surface of the article so as to cling thereto, (2) sufficient surface tension to spread out in thin film covering the article's surface, (3) compatibility with the article tested and the test equipment so as to avoid deleterious effects thereon, (4) the ability to evaporate off from the article into the amosphere after completion of the test without leaving residue, and (5) reasonable cost. Although other liquids may be used, in most cases it is advantageous to use water, which has these characteristics and is remarkably effective in augmenting the detection of leaks when sensing low amplitude vibrations of a frequency of 20,000 c.p.s and above.

It is to be noted that although an apparatus for testing can tops has been illustrated hereinabove, it is contemplated that can bodies may be tested within the spirit of the invention in a known manner, for example, by using the clamping and pressuring positions shown in my copending application, Ser. No. 559,297, filed June 21, 1966.

The vibrations produced by leakage of pressurized fluid through micro pores are of low intensity, i.e., very faint. The application of a film of moisture is very effective in augmenting the detection of the leakage vibrations. It is my theory that the presence of this film magnifies the agitation of the pressurized gas fluid as it exits from the leakage opening, i.e., increases the exit losses in the leakage gas flow. Regardless of whether this theory is correct, I have found that by utilizing the film of moisture in the manner specified, the detection of leakage vibrations is enhanced or augmented.

Nevertheless, it is to be understood that these leakage vibrations, even when augmented as above, are faint, and therefore the cavity 27, microphone pickup 26 and the amplifier 28 are arranged to be very sensitive. This sensitivity introduces a problem because ambient or spurious vibrations above 20,000 c.p.s. are often present in a typical factory or manufacturing plant including those where containers, or parts such as ends, bodies and the like are produced. These ambient vibrations are created by rotating or scraping metal parts, such as bearings, moving metal slides, conveyors, jangling keys, and so forth. The presence of ambient vibrations in the chamber 12 tends to cause the sensing elements to respond, thus giving false indications of leakage.

In order to be sure theat the leakage vibrations are sensed and that ambient or spurious vibrations do not produce an effective response, it is desirable to distinguish between the two types of vibrations. Ambient vibrations tend to be coherent in nature; that is, they have a pattern which is generally repetitive. In contrast, the leakage vibrations when present in the fluid in chamber 12 exhibit a random, incoherent pattern.

In addition to the problem of ambient vibrations of a coherent nature, there are brief powerful sudden vibrational impulses such as the banging of a hammer which tend to excite the microphone pickup, thus producing a false response in the sensing elements. It is desirable to distinguish the true leakage vibrations from these brief impulses.

To distinguish the true leakage vibrations from ambient vibrations and from impulses, the amplifier categorizer 29 is arranged to sense four characteristics of the vibrations. If any one of these four is absent, then the vibrations are not true leakage vibrations. These four characteristics are: (1) frequency range of vibrations; (2) duration of vibrations; (3) amplitude of vibrations; and (4) randomness of vibrations.

The output from the sensitive microphone 26 is initially amplified in amplifier 28 and the amplified signals are fed to the amplifier categorized 29. The frequency range is determined by including a band-pass filter having its low frequency cut off point set at approximately 20,000 c.p.s. so as to exclude all signals of lower frequency. The upper frequency cut off point is set at approximately 60,000 c.p.s., and preferably this upper limit is adjustable upwardly because in some cases the leakage vibrations include frequencies above 60,000 c.p.s. which higher frequencies are useful for leakage detection purposes.

The duration is determined by a time-delay circuit in the amplifier categorizer 29, and this time period is set at the length which experience shows to be the most effective for the particular container components being tested. This time period distinguishes true leakage signals from spurious external vibrations or impulses such as a banging hammer or door.

During this time period the coherence of the signal is sensed by a coherence detection circuit to make sure that the signal which is present is a random one, rather than having a coherent, regular, or correlated pattern.

The amplitude of the signal is determined by an amplitude responsive circuit, such as an amplifier stage in the amplifier categorizer 29 having a suitable threshold setting or bias level to exclude signals below a predetermined amplitude.

Those signals which are sensed to have all four of these characteristics are amplified by a suitable amplifier in the output of the amplifier categorizer 29 and are fed to the accept-reject relay switch to actuate it.

In some cases where the environment is substantially free of vibrations or impulses, it is possible to operate satisfactorily by utilizing a simpler sensing circuit, without an amplifier categorizer 29, and to connect the relay switch 42 directly to the output of the amplifier 28. In this case the relay is actuated by all amplified signals having a strength exceeding the minimum current level necessary to actuate the relay. Even if an occasional external vibration does excite the sensing elements, the result is merely to reject a satisfactory article which is a safe result. However, in most situations it is desirable to sense the four characteristics described to make sure that only true leakage vibrations are responded to so that satisfactory articles are not inadvertently rejected.

Although the various features of the invention have been shown as applied to several embodiments of the invention, it will be evident that changes may be made in such details and certain features may be used without departing from the principles of the invention.

What is claimed is:
1. A test apparatus for determining the leak tightness of container ends, bodies and the like adapted to be used in a production line for enabling the testing of each and every article by providing a quick determination of any of the articles having microleakage openings, said apparatus comprising means for applying pressurized fluid to a surface of the article to be tested, high frequency vibration sensitive detecting means, and support means positioning said detecting means to be directly responsive to the high frequency vibrations which are produced in the fluid near to the article by the passage of said pressurized fluid through any leakage openings therein; and means for depositing a film of moisture on the surface of the article to be tested prior to the application of said pressurized fluid for augmenting the detection of leakage vibrations.

2. A test apparatus for determining the leak tightness of container ends, bodies and the like which comprises:
   (a) walls forming a chamber, said chamber being adapted to be hermetically sealed and having a test opening therein;
   (b) means for sealingly clamping an article to be tested in a position covering said test opening of said chamber, said article having one surface bounding said chamber and the opposite surface thereof on the exterior of said chamber;
   (c) pressure means for applying a predetermined differential fluid pressure across said exterior surface of said article to be tested;
   (d) high frequency vibration sensitive detecting means sensitive to frequencies above 20,000 cycles per second and within said chamber for detecting any high frequency vibrations which are produced by the passage of said pressurized fluid through any leaks in the article to be tested; and
   (e) means for depositing a film of moisture on a surface of said article to be tested just before the application of said differential fluid pressure.

3. A test apparatus according to claim 2 in which the chamber is insulated for preventing the entrance into the chamber of vibrations created outside said chamber.

4. A test apparatus according to claim 2 in which said sealingly clamping means comprises locating means for positioning the article to be tested on said chamber to cover the test opening and sealing means shaped to engage with said locating means to seal said article in said test position.

5. A test apparatus for determining the leak tightness of container ends, bodies and the like adapted to be used in a production line for enabling the testing of each and every article by providing a quick determination of any of the articles having microleakage openings, said apparatus comprising means for applying pressurized fluid to a surface of the article to be tested, high frequency vibration sensitive detecting means sensitive to frequencies above 20,000 cycles per second, and support means positioning said detecting means to be directly responsive to the high frequency vibrations which are produced in the fluid near to the article by the passage of said pressurized fluid through any leakage openings therein; said detecting means being arranged to produce an output signal only when said high frequency vibrations occur for a predetermined duration, whereby spurious background noises are discriminated out.

6. A test apparatus according to claim 5, which further includes removal means for removing said tested article from the apparatus upon receipt of said output signal from said high frequency vibration sensitive detecting means.

7. A multistation production testing apparatus for determining the leak tightness of container ends, bodies and the like and for rejecting the unacceptable container ends and the like to be used in a container assembly line having predetermined feeding and ejection stations, said apparatus comprising:
   (a) a base;
   (b) a frame rotatably mounted on said base;
   (c) a multiplicity of test apparatus units according to claim 5 mounted on said frame and arranged in a circular array;
   (d) said frame and each of said test apparatus units arranged to rotate successively through said predetermined feeding and ejection stations;

(e) means for sequentially operating the sealingly clamping means, the pressure means, the moisture film depositing means, and the high frequency vibration sensitive detecting means of each of said test apparatus units as said frame rotates;

(f) rejection means for rejecting unacceptable articles from each of said test apparatus units at a predetermined station of rotation of said frame between said feeding and ejection stations upon receipt of a signal from said high frequency vibration sensitive detecting means of each test apparatus unit.

8. A method for determining the leak tightness of successive container ends, bodies and the like, and for rejecting the unacceptable container walls, ends and the like, said method adapted to be used in a container assembly line having predetermined feeding and ejecting stations, which comprises the following steps:

(a) applying a predetermined differential fluid pressure across a surface of said article to be tested;

(b) depositing a film of moisture on a surface of the article to be tested just before the application of said fluid pressure; and (c) detecting any high frequency vibrations above 20,000 cycles per second produced by the passage of said fluid through any leakage openings in the article being tested for determining the leak tightness thereof.

9. A method for determining the leak tightness of successive container ends, bodies, and the like as claimed in claim 8, in which said detecting also includes the steps of sensing the duration of said high frequency vibrations, sensing the amplitude of said high frequency vibration, and sensing the randomness of said high frequency vibration, for distinguishing true leakage vibrations from spurious externally created vibrations.

10. A method for determining the leak tightness of container ends, bodies and the like, which comprises:

(a) sound coupling a surface of an article to be tested to a high frequency vibration pickup for the detection of high frequency vibrations above a minimum frequency of 20,000 c.p.s.;

(b) applying a predetermined differential fluid pressure across the other surface of said article to be tested; and (c) detecting, identifying, and categorizing any of said high frequency vibrations which are produced by the passage of said pressurized fluid through any leaks in the article tested to produce an output signal only when said high frequency vibrations occur only for a predetermined duration, whereby spurious background noises are discriminated out.

11. A method for determining the leak tightness of container ends, bodies and the like which comprises:

(a) sound coupling a surface of an article to be tested to a high frequency vibration pickup for the detection of high frequency vibrations above a minimum frequency of 20,000 c.p.s.;

(b) applying a predetermined differential fluid pressure across the other surface of said article to be tested;

(c) depositing a film of moisture on a surface of said article to be tested just before the application of said fluid pressure; and (d) detecting, identifying, and categorizing any of said high frequency vibrations which are produced by the passage of said pressurized fluid through any leaks in the article tested.

12. A method for determining the leak tightness of successive container ends, bodies and the like and for rejecting the unacceptable container walls, ends and the like to be used in a container assembly line having predetermined feeding and ejecting stations, which comprises the following successive steps:

(a) sound coupling a surface of an article to be tested to a high frequency vibration pickup for the detection of high frequency vibrations above a minimum frequency of 20,000 c.p.s.;
surface o fsaid article to be tested;

(b) applying a predetermined fluid pressure to the other surface of said article to be tested;

(c) depositing a film of moisture on a surface of said article to be tested just before the application of said fluid pressure;

(d) detecting, identifying and categorizing any of said high frequency vibrations which are produced by the passage of said pressurized fluid through any leaks in the article tested;

(e) generating a signal in response to the categorized leakage vibrations; and (f) utilizing said signal to reject the unacceptable tested articles.

13. A test apparatus for determining the leak tightness of container ends, bodies and the like adapted to be used in a production line for enabling the testing of each and every article by providing a quick determination of any of the articles having microleakage openings, said apparatus comprising means for applying a differential of fluid pressure across a surface of the article to be tested, high frequency vibration sensitive detecting means sensitive to frequencies above 20,000 cycles per second, and support means positioning said detecting means to be directly responsive to the high frequency vibrations which are produced in the fluid near to the article by the passage of said fluid through any leakage openings therein; said detecting means being arranged to produce an output signal only when said high frequency vibrations occur for a predetermined duration, whereby spurious background noises are discriminated out.

14. A test apparatus for determining the leak tightness of container ends, bodies and the like which comprises:

(a) walls forming a chamber, said chamber being adapted to be hermetically sealed and having a test opening therein;

(b) means for sealingly clamping an article to be tested in a position covering said test opening of said chamber, said article having one surface bounding said chamber and the opposite surface thereof on the exterior of said chamber;

(c) pressure means for applying a predetermined fluid pressure to said exterior surface of said article to be tested;

(d) high frequency vibration sensitive detecting means sensitive to frequencies above 20,000 cycles per second and within said chamber for detecting any high frequency vibrations which are produced by the passage of said pressurized fluid through any leaks in the article to be tested; and (e) said detecting means being arranged to produce an output signal only when said high frequency vibrations occur for a predetermined duration, whereby spurious background noises are discriminated out.

References Cited

UNITED STATES PATENTS

| 2,696,107 | 12/1954 | Blaing-Leisk | 73—45.2 |
| 3,266,296 | 8/1966 | Hall | 73—40 |

FOREIGN PATENTS

| 659,977 | 3/1963 | Canada. | |

S. CLEMENT SWISHER, *Acting Primary Examiner.*

JEFFREY NOLTON, *Assistant Examiner.*

UNITED STATES PATENT OFFICE
CERTIFICATE OF CORRECTION

Patent No. 3,399,563　　　　　　　　　　　　　September 3, 1968

Thomas F. Helms

It is certified that error appears in the above identified patent and that said Letters Patent are hereby corrected as shown below:

Column 4, line 17, "openings" should read -- opening --. Column 6, line 13, "A" should read -- T --. Column 7, line 23, "vibration" should read -- vibrations --; line 71, "amplifier" should read -- amplified --. Column 12, line 7, cancel "surface of said article to be tested;".

Signed and sealed this 24th day of February 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents